United States Patent
Kim et al.

(10) Patent No.: US 9,224,123 B2
(45) Date of Patent: Dec. 29, 2015

(54) ELECTRIC PRODUCT AND METHOD OF CONTROLLING THE SAME

(71) Applicant: LG Electronics Inc., Seoul (KR)

(72) Inventors: Museung Kim, Changwon-si (KR); Yanghwan Kim, Changwon-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/036,666

(22) Filed: Sep. 25, 2013

(65) Prior Publication Data

US 2014/0091137 A1    Apr. 3, 2014

(30) Foreign Application Priority Data

Sep. 28, 2012 (KR) .......... 10-2012-0108702
Sep. 28, 2012 (KR) .......... 10-2012-0108704

(51) Int. Cl.
  *G06F 17/00* (2006.01)
  *G06Q 10/08* (2012.01)
  *G06K 9/00* (2006.01)

(52) U.S. Cl.
  CPC .......... *G06Q 10/087* (2013.01); *G06K 9/00449* (2013.01)

(58) Field of Classification Search
  CPC ..... G06Q 10/087; G06Q 30/02; G06Q 10/08; G06Q 20/20; G06Q 30/00; G06Q 90/00; G06Q 20/00; G06Q 10/00; G06F 17/00; G06F 7/08; G06F 19/00; G06K 19/00; G06G 1/14; A01K 5/02

USPC .......... 235/375, 381, 385, 487; 705/22, 28–29
See application file for complete search history.

(56) References Cited

U.S. PATENT DOCUMENTS

| | | | |
|---|---|---|---|
| 2004/0035925 A1* | 2/2004 | Wu et al. ................ | 235/380 |
| 2005/0038712 A1* | 2/2005 | Veeneman ................ | 705/26 |
| 2006/0085282 A1* | 4/2006 | Hanai et al. ............ | 705/26 |
| 2007/0084917 A1* | 4/2007 | Fajkowski ............... | 235/383 |
| 2007/0131765 A1* | 6/2007 | Park et al. ............. | 235/385 |
| 2008/0142599 A1* | 6/2008 | Benillouche et al. .... | 235/462.41 |
| 2009/0212113 A1* | 8/2009 | Chiu et al. ............. | 235/462.41 |
| 2011/0202394 A1* | 8/2011 | Borom et al. ........... | 705/14.1 |
| 2013/0006742 A1* | 1/2013 | Richard ................. | 705/14.25 |
| 2013/0238467 A1* | 9/2013 | Iwabuchi et al. ........ | 705/26.62 |
| 2014/0350708 A1* | 11/2014 | Kobayashi ............ | G06Q 10/06 700/108 |

* cited by examiner

*Primary Examiner* — Edwyn Labaze
(74) *Attorney, Agent, or Firm* — Dentons US LLP

(57) ABSTRACT

An electric product includes a recognition device to obtain an image of a recognition object, a control unit to recognize item information from the image obtained by the recognition device and compare the recognized item information with information stored in a memory unit, and a display unit to display a result of the comparison, wherein the control unit displays, on the display unit, category information corresponding to the recognized item information when the recognized item information matches the information stored in the memory unit.

18 Claims, 8 Drawing Sheets

Fig.6

```
        ITEM CODE    UNIT PRICE  AMOUNT   PRICE
    -------------------------------------------
    001    HITE CAN50ML
    *8801119834201         1,720      1      1,720
    002    OLATTE APPLE340ml
    *860109218024            890      1        890
    003    GERMINATED BARLEY TEA500ml
    *8806002005901           990      1        990
    004    ORAN C ORANGE500
    *8801097234413           980      1        980
    005    MAXIM TOP THE BLACK275ML
    *8801037087741         1,770      1      1,770
    006    MAX CANNED BEER500ML
    *8801119264206         1,720      1      1,720
    007    TROPICANA STRAWBERRY LATTE350
    *8801056034610           670      1        670
    008    BUSAN MILK1000ML
    *8801526132044         2,150      1      2,150
    009    BUSAN MILK 500ML
    *8801858011024         1,720      1      1,720
    010    DEMISODA APPLE410ml
    *8801097261310           640      1        640
```

Labels: 243, 240, 244

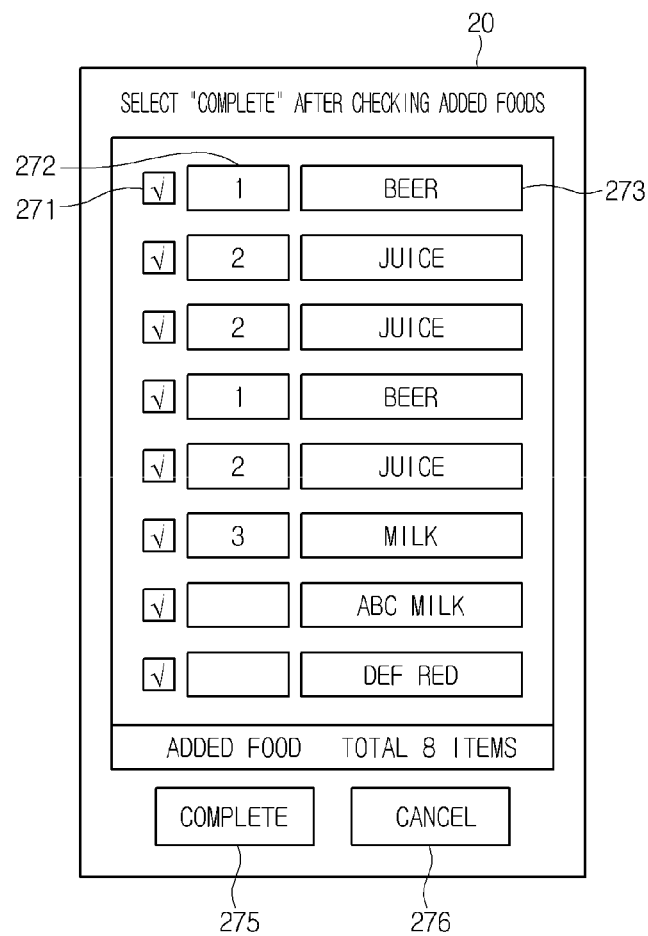

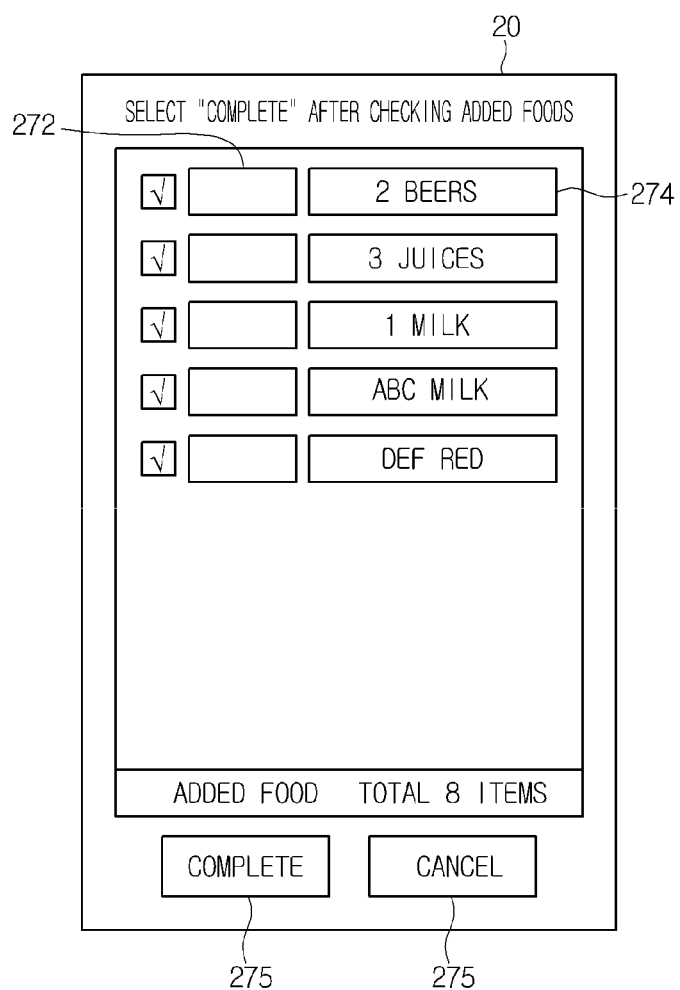

ELECTRIC PRODUCT AND METHOD OF CONTROLLING THE SAME

CROSS-REFERENCE TO RELATED APPLICATIONS

The present application claims priority under 35 U.S.C. 119 and 35 U.S.C. 365 to Korean Patent Application No. 10-2012-0108702 (filed on Sep. 28, 2012), and Korean Patent Application No. 10-2012-0108704 (filed on Sep. 28, 2012), which are hereby incorporated by reference in its entirety.

BACKGROUND

The present disclosure relates to an electric product and a method for controlling the same.

Typically, an electric product serves to manage or process a particular object by using electricity as a power source.

In the case where the electric product is a refrigerator, the refrigerator includes a main body for forming a storage room and a door for selectively shielding the main body. A display device for displaying an operation state of the refrigerator is provided to the door.

The display device includes a display unit for displaying a set temperature of the storage room and an input unit for adjusting the set temperature. However, the display device does not display information on items stored in the storage room or information on management (or processing) of the items. That is, the typical refrigerator is used only for storing food without recognizing the management or processing of information on the food.

Since the typical electric product does not recognize the management information or processing information on a specific object to be managed or processed by the electric product, a user experiences inconvenience in remembering or searching for the information.

In the case where the electric product is the refrigerator, the user should remember the management information (e.g., amount of stock or expiration date) of food stored in the refrigerator in order to consume food of which the expiration date is imminent or in order to plan to buy insufficient food.

In the case where the electric product is a washing machine, properties of materials of clothes or washing methods should be checked before operating the washing machine.

In the case where the electric product is a cooker, the user should check cooking methods before cooking by using the cooker.

SUMMARY

Embodiments provide an electric product and a method for controlling the same.

In one embodiment, an electric product includes a recognition device to obtain an image of a recognition object, a control unit to recognize item information from the image obtained by the recognition device and compare the recognized item information with information stored in a memory unit, and a display unit to display a result of the comparison, wherein the control unit displays, on the display unit, category information corresponding to the recognized item information when the recognized item information matches the information stored in the memory unit.

In another embodiment, an electric product includes a recognition device to obtain an image of a recognition object, a control unit to recognize item information from the obtained image and compare the recognized item information with information stored in a memory unit, and a display unit to display a result of the comparison, wherein the control unit controls the display unit so that information displayed when the recognized item information matches the information stored in the memory unit is different from information displayed when the recognized item information does not match information displayed on the display unit.

In further another embodiment, a method of controlling an electric product includes obtaining, by a recognition device, an image of a recognition object, recognizing, by a control unit, item information from the image obtained by the recognition device and comparing the recognized item information with information stored in a memory unit, and displaying, by a display unit, a result of the comparison, wherein the displaying of the result of the comparison includes displaying, on the display unit, by a control unit, the information stored in the memory unit when the recognized item information matches the information stored in the memory unit and displaying, on the display unit, the recognized item information itself when the recognized item information does not match the information stored in the memory unit.

The details of one or more embodiments are set forth in the accompanying drawings and the description below. Other features will be apparent from the description and drawings, and from the claims.

BRIEF DESCRIPTION OF THE DRAWINGS

FIG. 6 is a diagram illustrating a state where a recognition object region is extracted from an obtained image.

FIG. 7 is a diagram illustrating a screen displayed on the display unit of the refrigerator.

FIG. 8 is a diagram illustrating a screen displayed on a display unit according to another embodiment.

DETAILED DESCRIPTION OF THE EMBODIMENTS

Reference will now be made in detail to the embodiments of the present disclosure, examples of which are illustrated in the accompanying drawings.

In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense.

Figure 1:
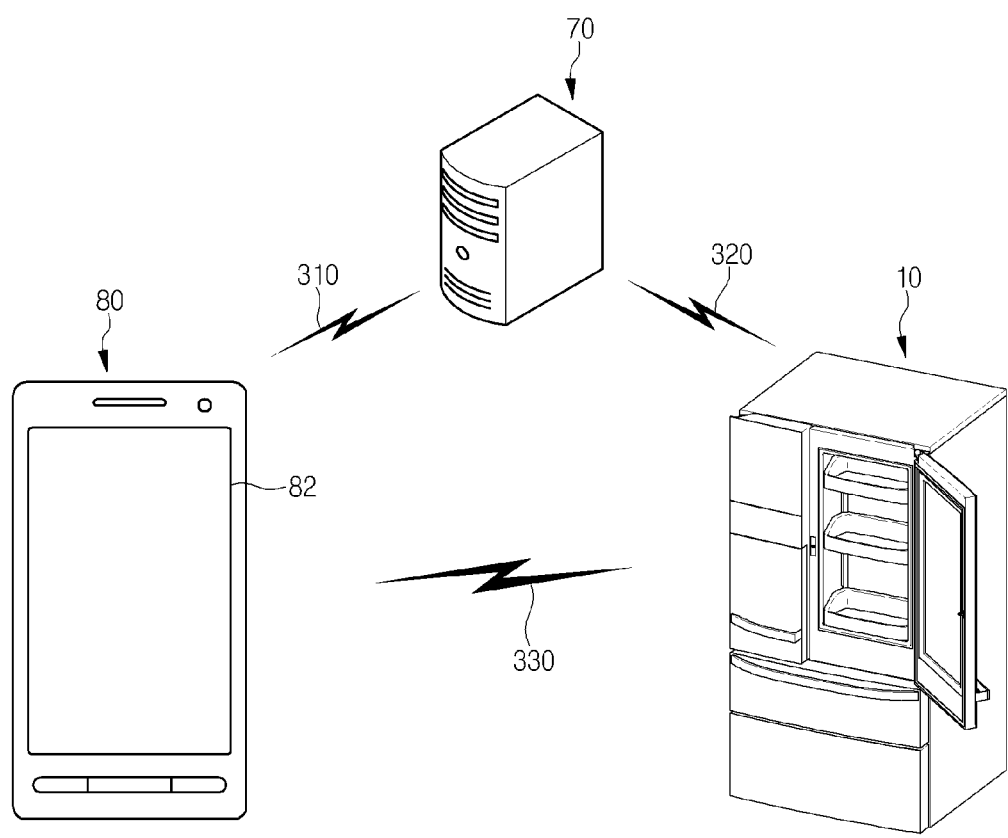
FIG. 1 is a diagram illustrating a network system according to an embodiment.
Figure 2:
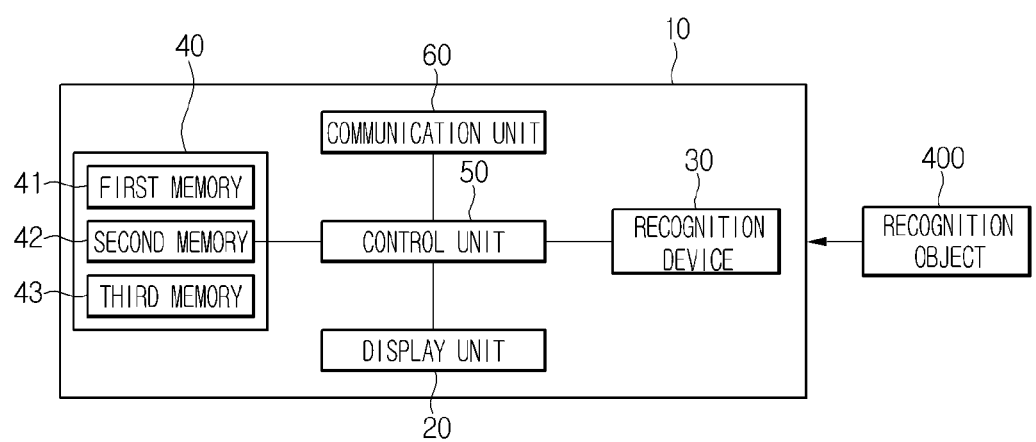
FIG. 2 is a block diagram illustrating a refrigerator in the network system.

FIG. 1 is a diagram illustrating a network system according to an embodiment, and FIG. 2 is a block diagram illustrating a refrigerator in the network system.

Referring to FIGS. 1 and 2, the network system according to an embodiment may include an electric product, e.g., a refrigerator 10 which generates cold air and stores an object (item), a terminal 80 connected to the refrigerator 10 so as to communicate therewith, and a server 70 connected to the refrigerator 10 and the terminal 80 so as to communicate therewith, the server 70 storing predetermined data.

The terminal 80 includes a display unit 82 for displaying predetermined information. Information on items stored in the refrigerator or information on an operation state of the refrigerator may be displayed on the display unit 82. That is, the terminal 80 may monitor the state of the refrigerator 10. Furthermore, an operation of the refrigerator may be controlled using the terminal 80. Furthermore, information recognized by the terminal 80 may be transmitted to the refrigerator 10.

For example, the terminal 80 may be a mobile phone or a smart phone, but is not limited thereto.

The network system may include a first interface 310 for communication between the terminal 80 and the server 70, a second interface 320 for communication between the server 70 and the refrigerator 10, and a third interface 330 for communication between the terminal 80 and the refrigerator 10.

For the first to third interfaces 310 to 330, at least one of communication techniques such as WiFi, ZigBee, Bluetooth, and Internet for transmitting information may be adopted. However, the first to third interfaces 310 to 330 are not limited thereto.

The refrigerator 10 may include a display unit 20 for displaying information, a recognition device 30 for recognizing information, a memory unit 40 for storing information related to an item, and a communication unit 60 for communicating with the server 70 or the terminal 80.

The recognition device 30 may include at least one of an image capturing device, an RFID reader, a QR code reader, a barcode reader, and a scanner. Hereinafter, it is assumed that the recognition device 30 is a camera belonging to the image capturing device.

The recognition device 30 may obtain an image of a recognition object 400. For example, the recognition object 400 may be a purchase receipt of an item. In the present disclosure, the item may be classified into a management object item and a non-management object item. The management object item may be item managed in the refrigerator and may be, for example, food.

An item-related information may include item information or item management information. The item information may include an item name, an item amount, or the number of items, and the item management information may include a location of an item stored in the refrigerator, a period of storage, a storage amount, or a storage method.

Furthermore, a part of the item-related information may be obtained from the image obtained by the recognition device 30.

The memory unit 40 may include a first memory 41 for storing management item information, a second memory 42 for storing information on an item selected by a user, and a third memory 43 for storing information related to items that are currently managed by the refrigerator. An item included in the management item information may be the above-mentioned management object item.

The management item information may be stored in the first memory 41 when the refrigerator 10 is manufactured. The management item information stored in the first memory 41 may be updated. For example, update information may be received from the terminal 80 or the server 70.

The information stored in the second memory 42 is management item information not stored in the first memory, and is related to an item selected as a management object by the user. Therefore, the first memory 41 may be referred to as a basic memory, and the second memory 42 may be referred to as user election memory.

A part of or the entirety of the information stored in the memory unit 40 may be stored in the server 70 or the terminal 80 or may be loaded on the server 70 or the terminal 80.

Figure 3:
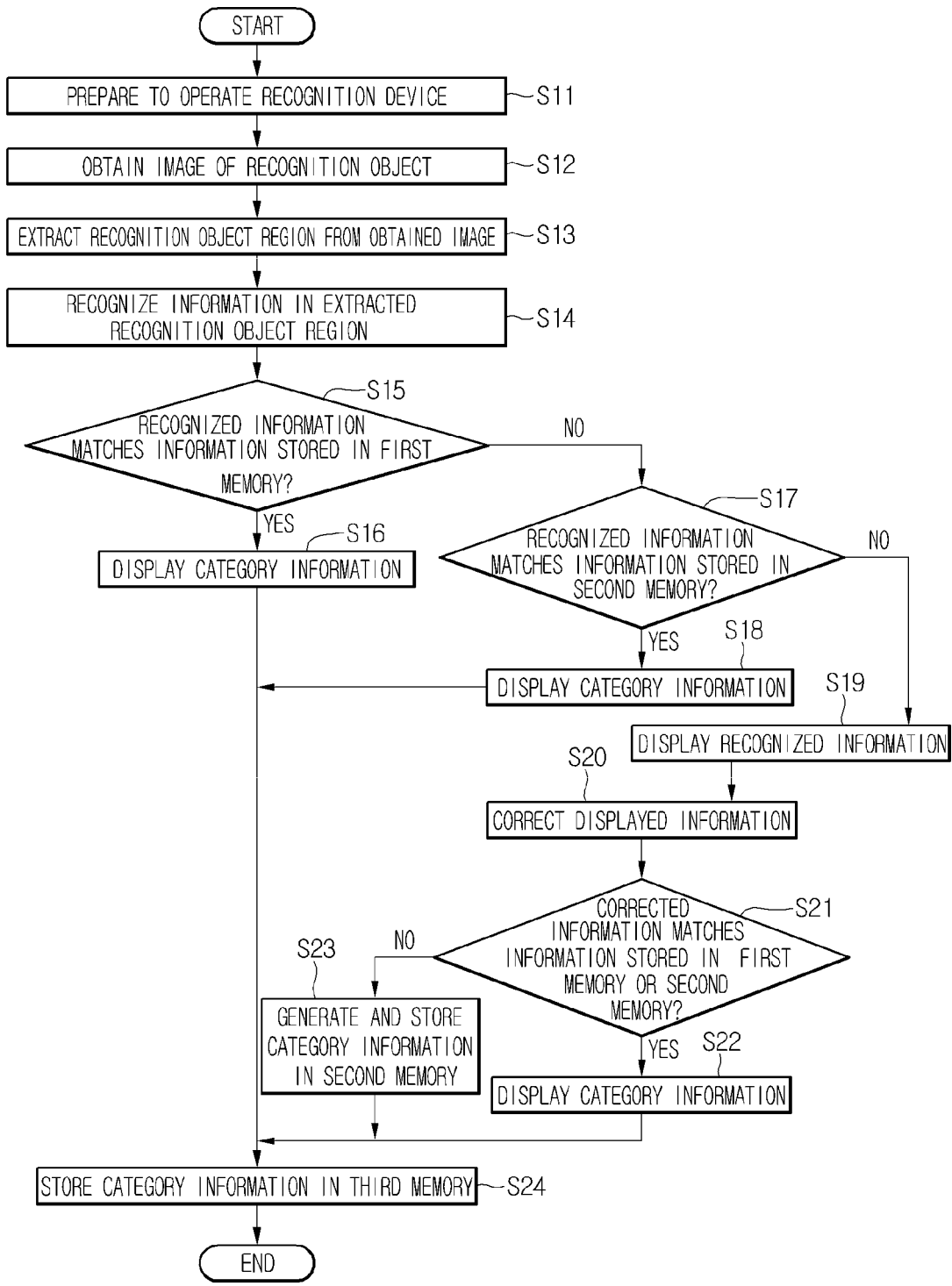
FIG. 3 is a flowchart illustrating an operating method of a recognition device according to an embodiment.
Figure 4:
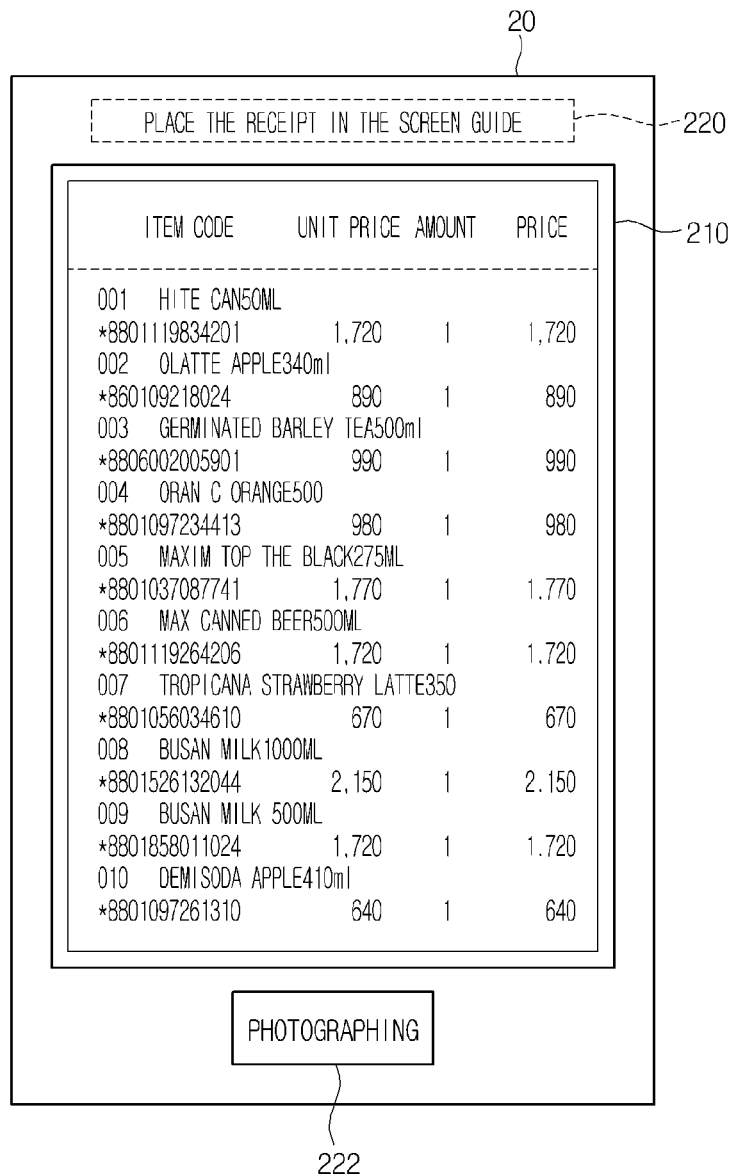
FIGS. 4 and 5 are diagrams illustrating screens displayed on a display unit of the refrigerator.
Figure 5:
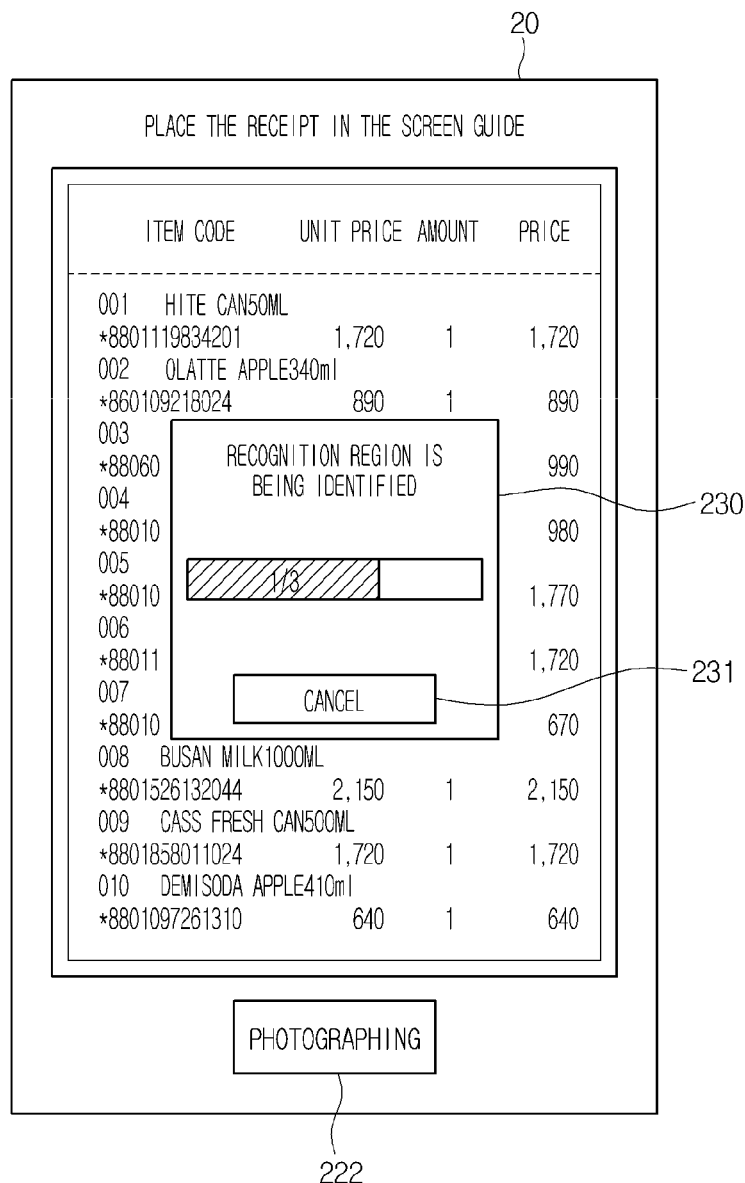

FIG. 3 is a flowchart illustrating an operating method of the recognition device according to an embodiment, FIGS. 4 and 5 are diagrams illustrating screens displayed on the display unit of the refrigerator, FIG. 6 is a diagram illustrating a state where a recognition object region is extracted from an obtained image, and FIG. 7 is a diagram illustrating a screen displayed on the display unit of the refrigerator.

Referring to FIGS. 3 to 7, the recognition device 30 prepares to operate in order to recognize the recognition object (operation S11). That is, the recognition device 30 is enabled. When the recognition device 30 is enabled, a guide frame 210 for guiding a location of the recognition object 400 may be displayed on the display unit 20, as illustrated in FIG. 4. Furthermore, guide information 220 for positioning the recognition object in the guide frame 210 may be displayed on the display unit 20.

Furthermore, a photographing button 220 for obtaining an image of the recognition object 400 may be displayed on the display unit 20. Therefore, when the photographing button 222 is selected, the camera photographs the recognition object 400 located in the guide frame 210 so as to obtain the image of the recognition object 400 (operation S12).

For another example, without selecting the photographing button 222, the camera may be enabled to automatically photograph the recognition object 400 after a lapse of a certain period of time after the recognition object 400 is positioned in the guide frame 210, thereby obtaining the image of the recognition object 400.

After the image of the recognition object 400 is obtained, a control unit 50 extracts a recognition object region from the obtained image (operation S13). Furthermore, the control unit 50 recognizes information included in the extracted recognition object region (operation S14).

Here, during a process of recognizing the information in the recognition object region, the control unit may display, on the display unit 20, information 230 indicating that the recognition is being performed, as illustrated in FIG. 5.

Referring to FIG. 6, in an embodiment, the recognition object region 240 represents a region where an item or items are recognized among the entirety of the obtained image.

A method of extracting the recognition object region 240 will be described.

When the recognition device 30 obtains the image of the recognition object 400, the control unit 50 divides the obtained image into a plurality of pixels. Each pixel has a unique coordinate value. Then, the control unit 50 determines a gray value of each pixel and assigns a unique value to each pixel. For example, a value of 1 is assigned if the gray value is greater than a reference value, and a value of 0 is assigned if the gray value is not greater than the reference value.

Thereafter, the control unit 50 extracts the recognition object region on the basis of the unique value of each pixel. For example, as illustrated in FIG. 6, the obtained image includes sequence numbers (e.g., 001, 002) of purchased items, an item name 243, an item code 244, a price, and an amount. The control unit 50 extracts the recognition object region 240 using at least one of the item sequence number, the item name 243, and the item code 244 as a determination criterion.

When the item sequence number is used as the determination criterion, a certain range is extracted as the recognition object region on the basis of a case where pixels assigned with the value within a certain coordinate range form a shape of 0 or 1.

In an embodiment, the extracting of the recognition object region 240 is not for extracting item information from the image but for extracting a region required for recognition on the image. The region required for recognition is extracted in order to reduce time taken for recognizing the item information on the image. That is, since unnecessary information is not recognized from the image, the time taken for recognition may be reduced.

At least one of the item name 243 and the item code 244 may be included in the extracted recognition object region 240. However, information included in the recognition object region 240 is not limited thereto, and thus, an amount, a price, and a purchase date may also be included as necessary.

After recognizing the item name and the item code in the recognition object region 240, the control unit 50 determines whether the recognized information matches the information stored in the first memory 41 (operation S15).

The management item information stored in the first memory 41 may include an item name (or item category), an item code corresponding to the item name (or item category), and an item ID corresponding to the item name (or item category).

Here, the control unit 50 may firstly compare the recognized item code with the item code stored in the first memory 41, and then, may compare the recognized item name with the item name stored in the first memory 41 if the item codes do not match. This sequence of comparisons may be reversed.

In the case where the recognized information matches the information stored in the first memory 41 according to a result of the determination in operation S15, the control unit 50 may display, on the display unit 20, category information as illustrated in FIG. 7. The category information may include an item category 273 and item ID information 272 corresponding thereto. The category information may further include icon information (not illustrated) corresponding to the item category 273.

Any one of the item category 273 and the item ID 272 may not be displayed. The item ID 272 is obtained by classifying the item category 273 with a number or a sign.

In one embodiment, a plurality of item names may belong to the item category. That is, in the case where item names are milk A, milk B, and the like, the item category 273 is milk. Here, the item ID 272 is information not recognized by the recognition device 30. Therefore, in one embodiment, the control unit 50 may display, on the display unit 20, the information not recognized by the recognition device 30.

Here, the recognized item name and the category information (e.g., item category) displayed on the display unit 20 may match or may be different from each other.

In one embodiment, the recognized information (item name or item code) may be corrected. For example, in the case where "milk" which is the information included in the recognition object region is recognized as "miik" by the recognition device 30, the recognized "miik" may be corrected to "milk". Furthermore, it may be determined whether the corrected item name matches the item name stored in the first memory 41.

In operation S15, the control unit 50 may determine whether at least one keyword included in the recognized information matches the information stored in the first memory 41. For example, in the case where the recognized item name is Korean milk, the control unit 50 may determine whether the keyword "milk" matches the information stored in the first memory 41.

In the case where the recognized information does not match the information stored in the first memory 41 according to a result of the determination in operation S15, the control unit 50 determines whether the recognized information matches the information stored in the second memory 42 (operation S17).

In the case where the recognized information (or corrected information) matches the information stored in the second memory 42 according to a result of the determination in operation S17, the control unit 50 may display, on the display unit 20, the category information (operation S18). As described above, the category information may include the item category 273 and the item ID information 272 corresponding thereto.

In the case where the recognized information does not match the information stored in the second memory 42 according to a result of the determination in operation S17, the control unit 50 displays, on the display unit 20, the recognized information itself (operation S19). For example, as illustrated in FIG. 7, in the case where the recognized item name is "ABC milk" or "DEF red" and the recognized item name does not match the item names stored in the first memory 41 and the second memory 42, the recognized item name "ABC milk" or "DEF red" are displayed on the display unit 20. That is, the category information and the recognized item name may be displayed together on the display unit 20.

The item name displayed on the display unit 20 may be changed or amended. Furthermore, when the item name is amended, the control unit 50 determines whether the amended item name matches the item names stored in the first memory 41 and the second memory 42 (operation S21).

In the case where the amended item name matches the item names stored in the first memory 41 and the second memory 42 according to a result of the determination in operation S21, the control unit 50 displays, on the display unit, the category information corresponding to the amended item name (operation S22). That is, the amended item name on the display unit 20 may be changed to the item category.

On the contrary, in the case where the amended item name does not match the item names stored in the first memory 41 and the second memory 42 according to a result of the determination in operation S20, the user may select a storage button that is not illustrated. Then, the recognized item code may be stored together with the amended item name in the second memory 42. Here, an item ID corresponding to the amended item name is automatically generated, and the generated item ID is stored together with the item code and the amended item name in the second memory 42 (operation S23). The information additionally stored in the second memory 42 may be used to be compared with the recognized information in operation S14.

In operation S19, the user may not amend the item name when the recognized item is displayed. In this state, the user may select the not-illustrated storage button. Then, the recognized item name, the recognized item code, and the generated item ID may be stored in the second memory 42.

Referring to FIG. 7, in the case where a plurality of item names are included in the recognition object 400, a plurality of pieces of category information may be vertically or horizontally arranged to be displayed on the display unit 20. A selection unit 271 for selecting the displayed category information may be further displayed on the display unit 20.

The selection unit 271 is used to select the management object item or the non-management object item. Alternatively, the selection unit 271 may not be provided, and the management object item or the non-management object item may be selected by touching the category information 271 or 273.

The user may determine whether an item is the management object item or the non-management object item by identifying the category information or the recognized item name displayed on the display unit 20. Furthermore, the user may select the selection unit 271 corresponding to the management object item. That is, the management object item to be managed by the refrigerator may be selected by the user. Here, a non-selected item becomes an actual non-management object item.

Although it has been described that the user selects the management object item by using the selection unit 271, the non-management object item may be selected by using the selection unit 271. That is, all the items displayed on the display unit 20 are determined as management object items. Furthermore, the user may select non-management object items from among the displayed items using the selection unit 271. For example, a mark shaped like "V" may be displayed on each selection unit 271, and the user may select the selection unit 271 to remove the mark.

That is, by making a selection between the management object item and the non-management object item by the user, an item to be managed is determined. Here, a food may be the management object item, but the food may be classified as the non-management object item according to a selection by the user.

Furthermore, a complete button 275 for inputting a command for initiating management of a displayed item and a cancel button 276 for canceling management of the displayed item may be displayed on the display unit 20.

When the user selects the complete button 275, management of the management object item is performed, and the category information on the item selected as the management object item on the display unit 20 is stored in the third memory 43 (operation S24). On the contrary, when the user selects the cancel button 276, the screen of FIG. 7 may return to the screen of FIG. 4.

For another example, in the case where the complete button 275 is selected without selecting an additional storage button while the recognized information itself is displayed on the display unit 20, the recognized item name, the recognized item code, and the generated item ID may be stored in the second memory 42.

Furthermore, information on the total number of items (categories) to be added as management objects may be displayed on the display unit 20.

The information stored in the first memory 41 may be updated. For example, the management item information may be added to the first memory 41. When the management item information (e.g., item name or item code) added during an update process matches the information (item name or item code) stored in the second memory 42, the information stored in the second memory 42 is deleted and the corresponding information may be stored in the first memory 41.

In the case where the recognition object region does not exist when the control unit 50 attempts to extract the recognition object region from the obtained image, the control unit 50 may display, on the display unit 20, information for re-obtaining an image.

According to an embodiment, the control unit does not recognize information on the entirety of the obtained image, but extracts the recognition object region and recognizes information included in the recognition object region. Therefore, recognition time of the control unit decreases.

Furthermore, since the recognition object is recognized and the item information is displayed on the display unit, the user may not experience inconvenience of inputting the item information.

FIG. 8 is a diagram illustrating a screen displayed on the display unit according to another embodiment.

Referring to FIG. 8, after the recognition of the information in the recognition object region is completed, category information 272 and 274 may be displayed on the display unit 20. The category information may include item ID information 272 and an item category 274. The item category 274 may include number information. For another example, the number information of the category may be displayed separately from the item category 274.

Although the refrigerator is described as an example of the electric product in an embodiment, the disclosure about the item information recognition may be applied to other electric products.

Furthermore, the operating method of the recognition device according to an embodiment may be applied to a terminal, and, in the present disclosure, the terminal may be included in the electric product. In this case, information on an item selected as the management object item in the terminal may be transmitted to the refrigerator. Alternatively, an image obtained by the terminal may be transmitted to the refrigerator so that the item information included in the image may be recognized in the refrigerator.

Furthermore, in an embodiment, the buttons displayed on the display unit may be replaced with an input unit provided separately from the display unit. That is, a complete command generated when the complete button is selected or a cancel command generated when the cancel button is selected may be inputted using the input unit.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electric product comprising:
   a recognition device to obtain an image of a recognition object, wherein the recognition device comprises a camera, the recognition object comprises item information having an item name, and the obtained image comprises the item information having the item name;
   a control unit to extract the item name of the item information from the image including the item name, and recognize the extracted item name and compare the recognized item name with information stored in a memory unit; and
   a display unit to display a result of the comparison,
   wherein the control unit displays, on the display unit, a list of category information corresponding to the recognized item name when the recognized item name matches the information stored in the memory unit and number information of the item category, and
   wherein the memory unit comprises:

a first memory to store management item information; and a second memory to store item information selected by a user, wherein the control unit determines whether the recognized item name matches the information stored in the first memory, and determines whether the recognized item name matches the information stored in the second memory when the recognized item name does not match the information stored in the first memory.

2. The electric product of claim 1, wherein the recognized item information is same as or different from the category information.

3. The electric product of claim 1, wherein the category information comprises at least one of an item category to which the item name belongs and item ID information.

4. The electric product of claim 3, wherein the category information further comprises icon information corresponding to the item name or the item category.

5. The electric product of claim 1, wherein the control unit corrects the recognized item name and then compares the corrected item name with the information stored in the memory unit.

6. The electric product of claim 1, wherein, when the control unit determines that the recognized item name does not match the information stored in the memory unit, the control unit displays, on the display unit, the recognized item name itself.

7. The electric product of claim 6, wherein the item name on the display unit is correctable by a user, and, when the control unit determines that the item name displayed on the display unit is corrected, the control unit compares the corrected item name with the information stored in the memory unit.

8. The electric product of claim 7, wherein, when the control unit determines that the corrected item name matches the information stored in the memory unit, the control unit displays, on the display unit, the category information corresponding to the corrected item name.

9. The electric product of claim 1, wherein, when the recognized item name matches the information stored in the first memory or the second memory, the control unit displays, on the display unit, the category information corresponding to the recognized item name, and, when the recognized item name does not match the information stored in the first memory and the second memory, the control unit displays, on the display unit, the recognized item name itself.

10. The electric product of claim 9, wherein the control unit stores the displayed item name in the second memory.

11. The electric product of claim 10, wherein the second memory stores newly generated information in addition to the displayed item name.

12. The electric product of claim 9, wherein the information stored in the first memory is updatable, and, when information added to the first memory matches the information stored in the second memory during an update process, the matched information stored in the second memory is deleted.

13. The electric product of claim 1, wherein the memory unit further comprises a third memory to store information related to items currently managed by the electric product, wherein, when the control unit determines that a command for initiating management of an item displayed on the display unit is inputted, the control unit stores information displayed on the display unit in the third memory.

14. The electric product of claim 1, wherein the control unit displays, on the display unit, information not included in the obtained image.

15. The electric product of claim 1, wherein, when a partial keyword in the recognized item name matches an item name stored in the memory unit, the control unit determines that the recognized item name matches the information stored in the memory unit.

16. An electric product comprising:
a recognition device to obtain an image of a recognition object, wherein the recognition device comprises camera, the recognition object comprises one or more item names, the obtained image comprises at least one item name of the one or more item names;
a control unit to extract the at least one item name from the obtained image, recognize the extracted item name, and compare the recognized and extracted item name with information stored in a memory unit; and
a display unit to display a result of the comparison,
wherein the control unit controls the display unit so that information displayed when the at least one of the recognized item name matches the information stored in the memory unit is different from information displayed when the at least one of the recognized item name does not match information displayed on the display unit,
wherein when the at least one of the recognized item name matches the information stored in the memory unit, the control unit displays, on the display unit, the information stored in the memory unit, and when the at least one of the recognized item name does not match the information stored in the memory unit, the control unit displays, on the display unit, the at least one of the recognized item name itself,
wherein the control unit displays, on the display unit, a list having at least one of the information stored in the memory unit or the recognized item name itself, and number information of the information stored in the memory stored in the memory unit.

17. The electric product of claim 16, wherein the information stored in the memory unit is category information corresponding to the at least one of the recognized item name.

18. An electric product comprising:
a recognition device to obtain an image of a recognition object;
a control unit to recognize item information from the image obtained by the recognition device and compare the recognized item information with information stored in memory unit; and
a display unit to display a result of the comparison,
wherein the control unit displays, on the display unit, category information corresponding to the recognized item information when the recognized item information matches the information stored in the memory unit,
wherein the memory unit comprises:
a first memory to store management item information;
a second memory to store item information selected by a user,
wherein the control unit determines whether the recognized item information matches the information stored in the first memory, and determines whether the recognized item information matches the information stored in the second memory when the recognized item information does not match the information stored in the first memory.

* * * * *